Nov. 4, 1930.    J. M. CROWE    1,780,174
PORTABLE POWER SAW
Filed Jan. 16, 1928    3 Sheets-Sheet 1
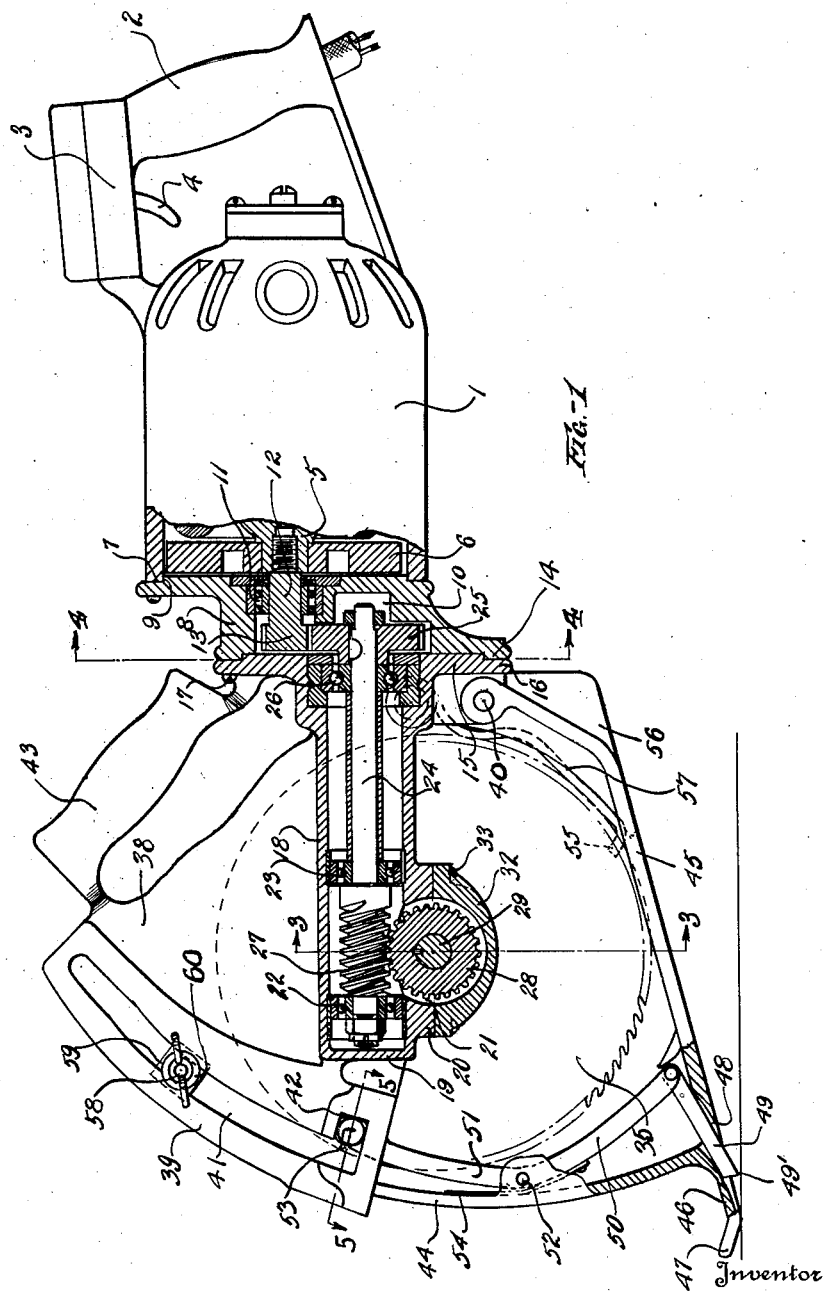
Inventor
John M Crowe
By Brockett & Hyde
Attorneys Nov. 4, 1930.                J. M. CROWE                1,780,174
                           PORTABLE POWER SAW
                           Filed Jan. 16, 1928          3 Sheets-Sheet 2
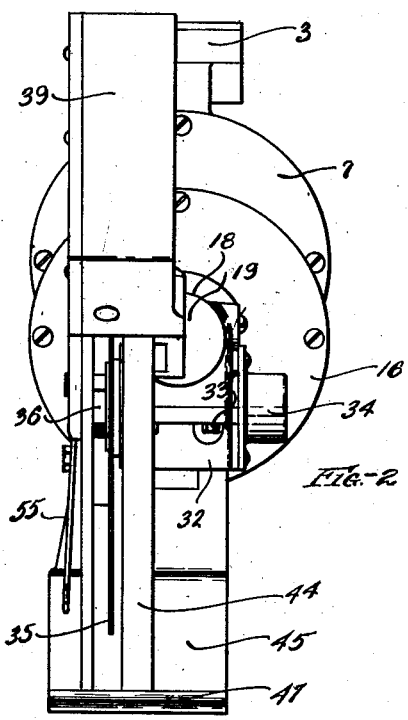
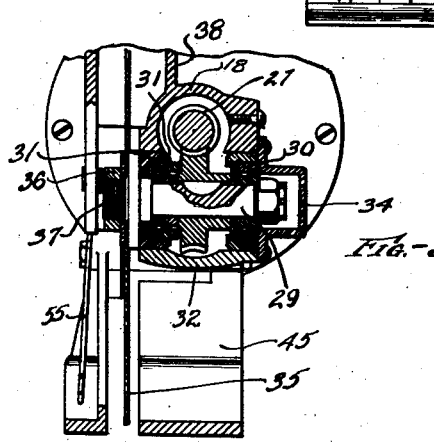
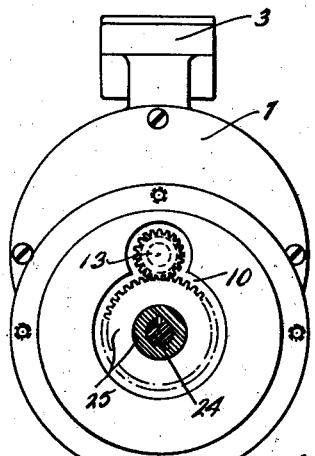
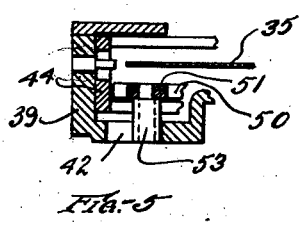
Inventor
John M Crowe
By Brockett & Hyde
Attorneys

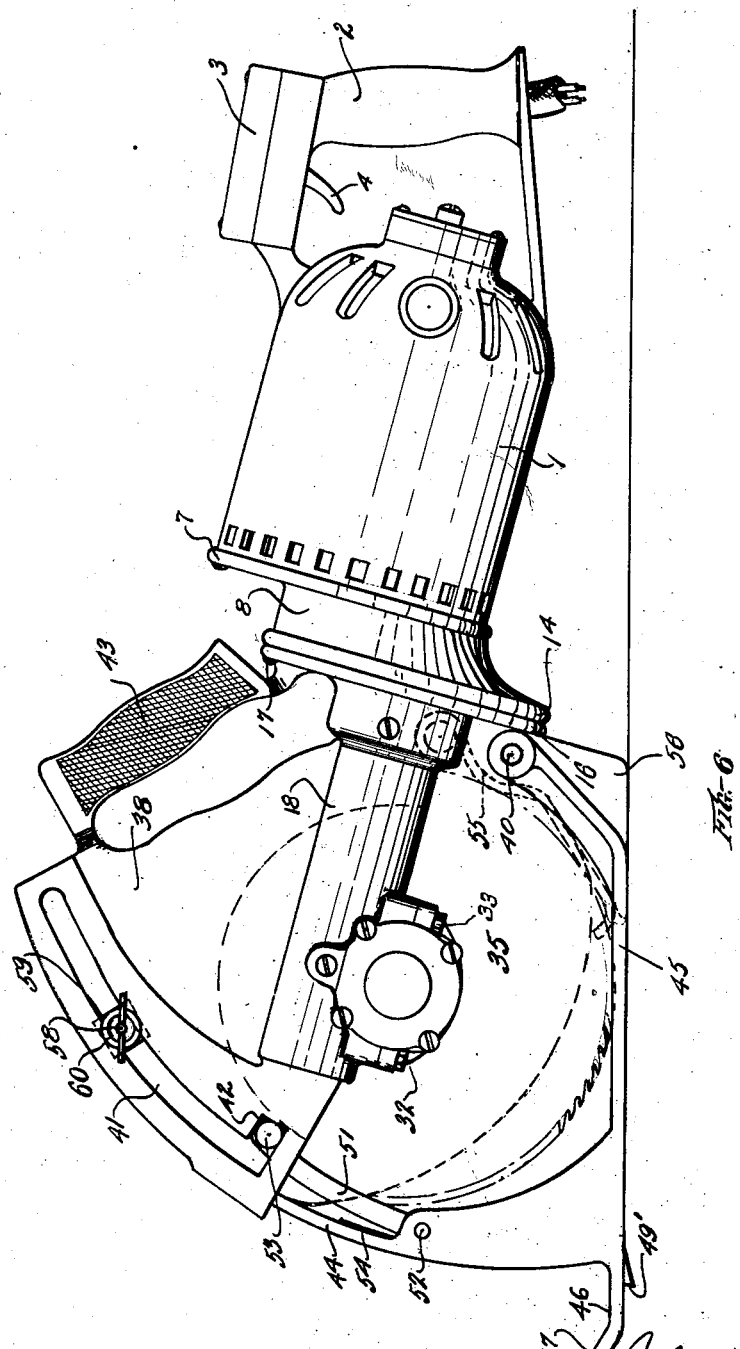

Patented Nov. 4, 1930

1,780,174

UNITED STATES PATENT OFFICE

JOHN M. CROWE, OF COVINGTON, KENTUCKY, ASSIGNOR, BY MESNE ASSIGNMENTS, TO THE STANLEY WORKS, OF NEW BRITAIN, CONNECTICUT, A CORPORATION OF CONNECTICUT

PORTABLE POWER SAW

Application filed January 16, 1928. Serial No. 247,056.

This invention relates to portable hand tools and particularly to those of the saw or like type utilizing a rotary cutter of some form.

The rotary cutter, in many instances, must have considerable cutting power and in many instances must attain considerable speed. The power and speed is obtained from a suitable motor means, such as an electric motor, carried by the device and preferably forming a part of it and arranged in a suitable position with respect to the tool or cutter so as not to interfere with the handy and accurate manipulation of the cutter upon the work. It is also important in a tool of this kind that the motor means be of a high speed type in order that it may be small and light and yet capable of furnishing the necessary power, and to employ such a motor means it is essential that suitable speed reductions be made in order that the cutting tool may be driven with sufficient power and speed to perform the work for which it is intended. The handy manipulation of these tools requires that the motor means and the drive to the cutter be on a longitudinal axis which is normal to the axis of the cutter, requiring an angular drive to the cutter as well as suitable speed changes or reduction. When the entire speed reduction is made between the driving element or shaft of the motor means and the shaft or driving element of the cutter, considerable heat is developed in the power transmission, this point thus materially subjecting the tool to the danger of undue grief upon the gears or transmission and preventing the continuous heavy duty operation of the tool.

The present invention, therefore, is aimed to overcome the above mentioned disadvantages and to produce an arrangement of the motor means and saw end whereby the tool is handy and easy to manipulate upon the work and whereby the heat and friction are distributed by a substitution of double gear reduction between the motor and cutter so that the latter may be driven at an efficient speed and be capable of continuous heavy duty.

Another feature of the invention is the provision of a sensitive latch mechanism for the movable guard which protects the user against the dangers accompanying the use of a cutter of this type when the tool is not in actual use.

Other features of the invention will appear from the following description, drawings and claims.

Referring to the drawings, Fig. 1 is a side elevation of the saw constructed according to my invention; Fig. 2 is a front end view; Fig. 3 is a section upon the line 3—3, Fig. 1; Fig. 4 is a section upon the line 4—4, Fig. 1; Fig. 5 is a section upon the line 5—5, Fig. 1; and Fig. 6 is a side elevation with the tool in the vertical position.

In the arrangement shown in the drawings, 1 represents a motor casing provided with a suitable handle 2, a control switch casing 3 and a switch lever 4 adapted to open and close the motor circuit in any suitable manner and thereby govern its operation. The casing 1 is provided with a suitable motor of any preferred type having an armature indicated at 5 upon which is mounted the usual fan 6 for cooling the motor.

In the portable tools of the saw or cutter type heretofore made by this applicant, the cutter or saw end, as will be described, was secured directly to the casing 1 at the point 7 and the axis of the armature 5 was in alignment with the driving shaft extending out to the cutter. This arrangement entailed a low motor level and limited the possibilities of manipulation of the tool as will be brought out more completely when the machine as now developed has been completely described.

Secured to the end face 7 of the casing 1, or forming a part of this casing, is a gear housing 8 having a suitable shouldered flanged structure 9 cooperating with the head 7 and a suitable chamber 10 for the reception of the transmission gears. Arranged in this gear housing, in a suitable ball bearing structure 11, is a pinion shaft 12 secured to the armature 5 and carrying a driving pinion 13 adapted to mesh with the driven gear of the cutter driving shaft, as will appear.

Opposite and downwardly from the flange structure 9 and forming a part of the gear housing, is another flange 14 similar to the end 7 of the motor casing and this flange is adapted to receive the saw or cutter end. The saw or cutter end comprises a supporting flange 15 having a shoulder flange structure 16 for engagement with the flange 14 and secured thereto by suitable screws 17. This flange has a tubular extension 18 extending forward with its axis in parallel alignment with the axis of the armature of the motor. The tubular extension 18 is closed at its outer end as at 19 and is provided with a pad 20 on the lower side thereof for receiving and forming a bearing 4 for the saw or cutter shaft, as will appear. A suitable opening 21, through this pad, permits the saw or cutter gear to extend into the tubular extension 18. Within this tubular extension is a forward ball bearing structure 22 and a rear ball bearing structure 23 both spaced apart and engaging a saw or cutter driving shaft 24 extending rearwardly into the opening 10 of the housing 8 and there provided with a driven gear 25 in mesh with the pinion 13. Within the flange 15, this same shaft 24 is provided with another ball bearing structure 26. Between the bearings 22 and 23 is a driving worm 27 secured to or forming a part of shaft 24 and meshing with a worm wheel 28 rigidly secured to the saw or cutter shaft 29 which is mounted in ball bearing structures 30 and 31 secured in suitable recesses in the pad 20 and in a bearing block 32 secured to the pad by suitable screws 33. A suitable cap 34 houses one end of the saw or cutter shaft while the other end extends outward and receives the saw or cutter blade 35 held in place by a suitable nut 36 engaging the threaded end 37 of the saw shaft.

From the foregoing, it will be seen that the flanges on the gear housing elevate the motor with respect to the saw end and result in the motor being out of the way so that the saw may be manipulated nicely for shallow cuts, and at the same time maintain parallel alignment between the motor axis and the shaft transmitting power to the cutter. The provision of the double reduction in gear transmission also results in some of the grief of power transmission being taken up by the spur gears in the transmission housing.

Forming a part of the tubular extension 18 is an upper or fixed guard and it comprises side webs 38 enclosing the upper part of the saw blade 35 and is provided with an arcuate forward portion 39 extending in an arc about a center pivot 40 forming a part of the flange 16 below the tubular extension 18. The side of this arcuate portion 39 is provided with a slot 41 of a suitable length to provide stop means for the movable guard as will be described. At the lower end of the slot the guard is provided with an inwardly extending recess 42 forming a shoulder for the latch to be described. This fixed guard is provided with a suitable handle 43 at the upper back corner toward the motor casing and this handle as well as the handle 2 are used for manipulating the tool.

Slidably mounted in the arcuate portion 39 is a movable guard and guide member 44 slidable in the portion 39 and forming a part of the runner or base portion 45 of a movable guard. This base portion is slit to permit the passage of the saw blade therethrough and it has two separate rear portions 45 extending upwardly and pivoted on a pin at the pivot 40. This base portion 45 of the movable guard is provided with a forwardly extending toe 46 having an upturned front portion 47 and an opening 48 somewhat tangential to the saw blade. Extending through this opening 48 is a suitable trip 49 extending tangential to the saw blade and pivoted to the lower arm 50 of the latch lever 51 pivoted at 52 in the guide member 44 of the movable guard. The upper end of this latch lever carries a laterally extending roller 53 adapted to move in the slot 41 and engage the locking opening 42.

A spring 54, secured to the lower end 50 of the latch lever, and engaging the guiding portion 44, tends to move this latch lever 51 in a clockwise direction and into engagement with the latching recess. A spring 55 normally tends to maintain the guard 45 in downward or guarding position, as shown in Fig. 1. Secured to the flange 16 and extending downward in alignment with the saw and between the side portions 45 of the runner or base is the kerf guard 56 of flat metal form cut at 57 to conform to the configuration of the periphery of the saw and arranged to travel in the kerf cut thereby.

To regulate the depth of the cut, the slot 41 in the arcuate portion 39 is provided with stop means and comprises a bolt 58 having an enlarged head 59 in the path of the upper end of the arc shaped guard portion 44 and held in place by a suitable thumb or clamping nut 60 threaded on to the bolt.

In use the operator places either the runner or its toe portion 46 in engagement with the work or its edge and urges the entire machine forward. This operation moves relatively rearwardly the nose 49 of the trip 49 and turns the latch lever 51 in counter-clockwise direction, as shown in Fig. 1, which releases the movable guard, permitting it to recede and the saw to move down into cutting position. This operation is, of course, performed after the saw blade has been set in motion by operating the switch to start the motor.

When the sawing operation has been completed and the saw is removed from the work, the guard immediately snaps back to full guarding position where it is locked against accidental movement. Since the saw is operated upon the runner or base 45 and various depths of cuts are made from time to time, the position of the motor has much to do with the handiness of the tool and by elevating the motor to an upper offset position, as is obvious from the shape of the housing 8 and the arrangement of the transmission gears, the tool is rendered extremely handy in operation and the motor is raised from engagement with the work, especially where shallow cuts are being made.

What I claim is:

1. In a portable tool, a frame, a cutting blade operatively mounted thereon, means for operating said blade, guarding means adapted to advance or retreat to guard or expose a cutting portion of said blade, means tending to advance said guarding means, latch means for securing said guarding means against accidental retreat, said guarding means having a work-engaging portion with a forwardly and downwardly extending bore therein, means slidable longitudinally in said bore and positioned thereby and associated with said latch means to actuate the same, and extending longitudinally into the path of the work to be engaged thereby to release said guarding means.

2. In a portable power-driven hand-tool, a frame, a blade-carrying shaft mounted transversely thereupon, a longitudinal shaft mounted on said frame and extending above said transverse shaft, cooperative gearing on said shafts, a motor arranged rearwardly of said frame and having a driving shaft extending parallel to and above said longitudinal shaft, said driving and longitudinal shafts having cooperative gearing, a guard member having pivotal connection with said frame rearwardly of said transverse shaft and forwardly of said second mentioned gearing and movable about said connection to guard or expose a cutting portion of said blade and having a work-engaging surface, said parts being so disposed that said driving and longitudinal shafts approach the plane of said surface as they extend rearwardly, a handle on the rear end of said motor, and a handle located on said frame above said longitudinal shaft and forwardly of said pivotal connection.

In testimony whereof I hereby affix my signature.

JOHN M. CROWE.